Patented July 31, 1951

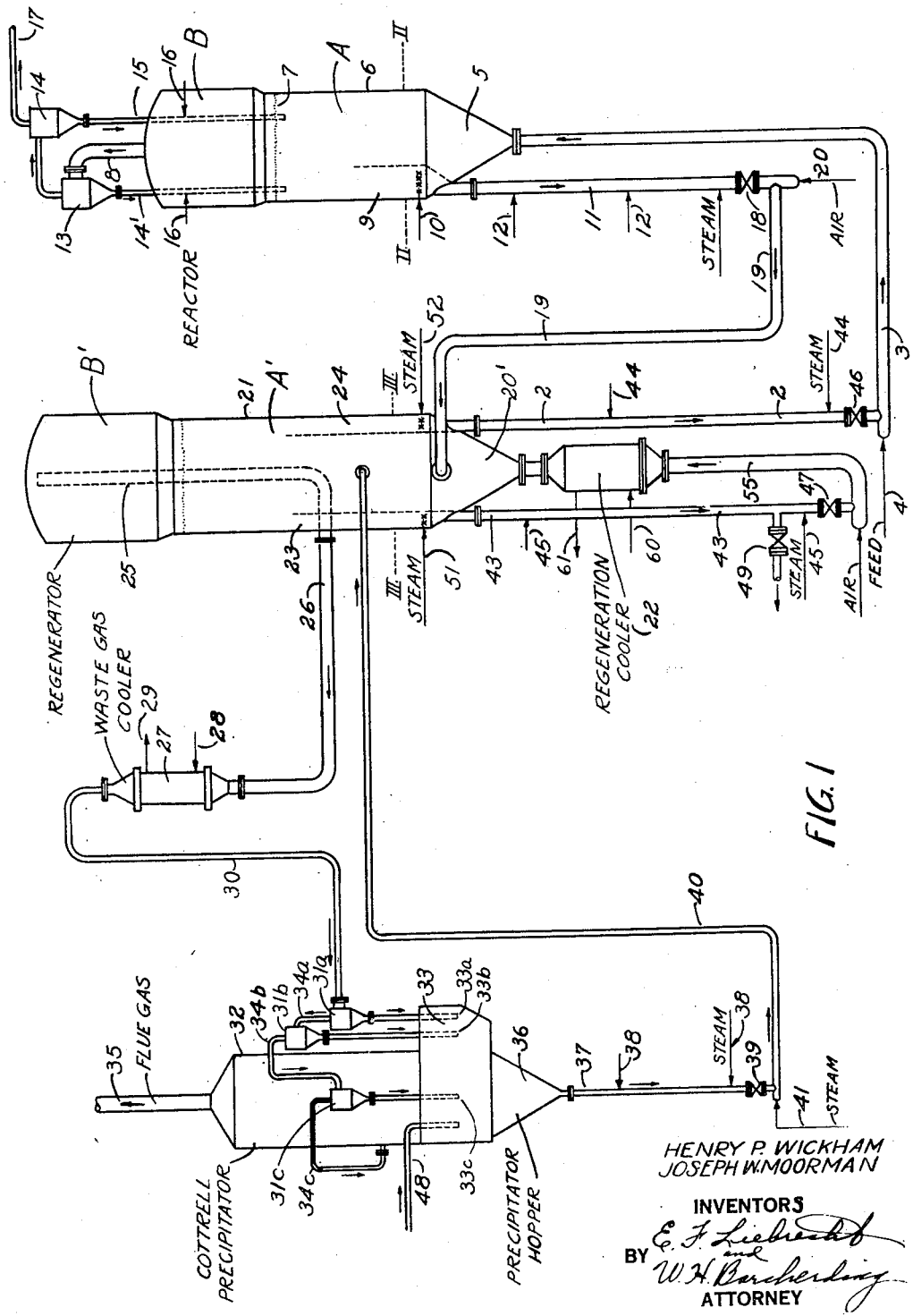

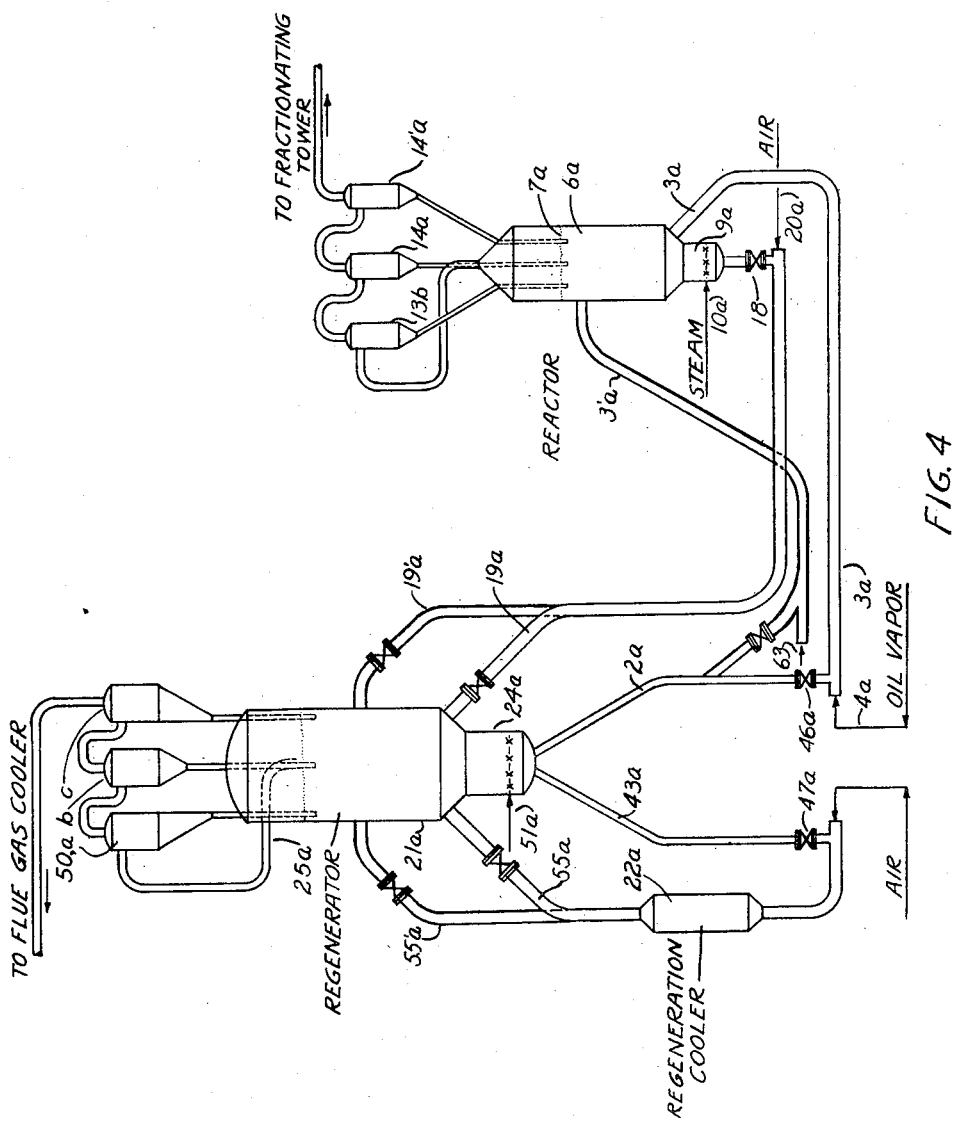
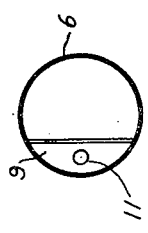 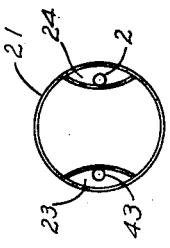
HENRY P. WICKHAM
JOSEPH W. MOORMAN
INVENTORS

2,562,225

UNITED STATES PATENT OFFICE 2,562,225

CONTACTING GASEOUS MATERIALS WITH FLUIDIZED SOLIDS

Henry P. Wickham, Glen Head, N. Y., and Joseph W. Moorman, Alpine, N. J., assignors to The M. W. Kellogg Company, Jersey City, N. J., a corporation of Delaware Application July 31, 1941, Serial No. 404,898

19 Claims. (Cl. 196—52)

The present invention relates to improvements in process and apparatus for effecting catalytic conversions. The invention is directed particularly to an improved continuous process of converting hydrocarbons by treatment over catalytic materials which become spent or deactivated during the conversion, and which accordingly require periodic regeneration treatment to fit them for reuse in the conversion step. In its specific aspects, the invention is especially concerned with the catalytic conversion of high boiling hydrocarbons such as petroleum gas oil and the like into low boiling hydrocarbons within the gasoline boiling range.

It has been proposed heretofore to catalytically convert high boiling hydrocarbons such as a petroleum gas oil to low boiling hydrocarbons within the gasoline boiling range by passing vapors of the high boiling hydrocarbons under suitable reaction conditions in contact with a fixed or stationary bed of a cracking catalyst disposed in a catalyst chamber. Pursuant to such processes, after the activity of the catalyst is decreased by reason of the formation of a carbonaceous deposit thereon to an extent where regeneration is necessary or desirable, the activity of the catalyst is restored by stopping the flow of oil vapor to the chamber and passing an oxygen-containing gas into the chamber in contact with the spent catalyst, thereby regenerating it in situ by combustion of the carbonaceous deposit. Although such processes are commercially practicable they are subject to a number of inherent limitations and disadvantages which are eliminated in our process. Among these are the intermittent nature of the operation, variations in product quality and quantity during the reaction period and difficulty of temperature control, particularly in the regeneration operation.

A process whereby various of the objectionable limitations and disadvantages of the stationary bed or intermittent type of operation are eliminated is described in copending application Serial No. 390,164, filed April 24, 1941, by P. C. Keith and J. W. Jewell, which issued as Patent No. 2,515,373 on July 18, 1950. In accordance with the Keith et al. application, continous operation and uniformity in yield and quality of products in the practice of catalytic reactions, such as catalytic cracking and the like, are obtained by a procedure wherein the vapors of the oil undergoing conversion are passed in contact with a dense phase of finely divided catalytic material confined in a reaction zone, and the average catalytic activity of the dense catalytic phase is maintained substantially uniform by adding active catalyst thereto and removing spent catalyst therefrom in admixture with the vaporous reaction products.

In certain of its aspects the present process may be regarded as an improvement on the general type of process described in said Keith et al. application. One of the features of the present process resides in the withdrawal of catalytic material directly from the dense catalyst phase in the conversion zone and regeneration zone and separately from the vaporous or gaseous reactants, and the utilization of this feature to assist in the continuous circulation of catalytic material through the regeneration and conversion zones.

Various important advantages over the heretofore proposed processes are attained in the practice of our invention. Some of these advantages are: (a) the elimination of or substantial reduction in the tendency of coarser particles to accumulate and remain for an unduly long period in the reaction zone, (b) reduction in the pressure differential which must be overcome in the cyclic circulation of the catalyst through the conversion and regeneration zones, (c) facilitation of control of the quantity of catalyst maintained in the conversion and regeneration zones. Various other advantages and features of the invention will be apparent from the following detailed description thereof given in connection with the appended drawings, wherein:

Fig. 1 illustrates diagrammatically a suitable process flow and an arrangement of apparatus for use in the practice of the invention including a reactor or conversion chamber and a catalyst regeneration chamber or regenerator, and illustrates the details of these elements and their interconnection.

Fig. 2 is a sectional view of the reactor taken along lines II—II of Fig. 1.

Fig. 3 is a sectional view of the regenerator taken along lines III—III of Fig. 1.

Fig. 4 is a view similar to Fig. 1 of a modified form of reactor and regenerator.

Referring to Fig. 1, a finely divided or powdered active actalyst is introduced through outlet valve 46 of a regenerated catalyst standpipe 2 into a stream of the feed vapors traveling at a relatively high velocity through the reactor inlet line 3. Both the catalyst and vapors preferably are heated prior to their mixture in their line 3 to an elevated temperature suitable for the subsequent conversion. Vaporized feed, together with steam if desired, may be supplied to line 3 by a transfer line 4 leading from a pipe still heater or other suitable source of vaporized feed stock. Catalyst thus introduced from pipe 2 is picked up by the vapors and carried therewith through line 3 into a conical inlet 5 in the lower part of reactor 6. Reactor 6 is a vessel, in the form of a cylinder or other suitable shape, having a relatively great cross-sectional area compared to the cross-sectional area of the vapor inlet line 3, and these relative proportions cause a corresponding reduction in the velocity of the vapors after their passage from inlet line 3 into the reactor 6. The velocity of the vapors in reactor 6 is preferably maintained within such limits as to produce therein a highly concentrated or dense phase of the catalyst. This condition, in general, is characterized by the relatively high concentration of catalyst measured in terms of the quantity of catalyst per unit volume of reactor space, and by the low velocity of reactant vapors maintained through the reactor.

Pursuant to this process, this dense catalyst phase (zone A) extends only partially through the total reactor space, an approximate upper horizontal level thereof being indicated by dotted line 7. The enlarged zone B of the reactor above this level constitutes a catalyst-vapor disengaging space, a relatively small proportion of the total catalyst introduced being carried out overhead with the vaporous conversion products from zone B through vapor outlet line 8. Used catalyst is withdrawn from the reaction zone by a catalyst withdrawal passageway 9 opening directly into the dense catalyst phase in zone A. The relative cross-sectional areas of catalyst outlet 9 and reactor 6 are shown by Fig. 2. A suitable inert gas such as steam is introduced in the lower portion of the catalyst withdrawal passageway 9 through line 10 to displace or strip hydrocarbon vapors mixed or entrained with the separated catalyst and to maintain the catalyst therein in an aerated flowable condition. Catalyst is withdrawn from passageway 9 through a catalyst standpipe 11 to which an inert aerating medium is supplied by means of inlet lines 12 distributed at suitable intervals along the length of standpipe 11 to maintain the catalyst flowing therethrough in a state wherein it approximates a liquid with respect to its flow characteristics and density.

The vaporous conversion products containing a relatively small proportion of the total catalyst fed to the reactor, that is an amount of the order of about 15% or less, pass overhead from zone B through outlet 8 to a suitable gas-solid separating system. This separating system may consist of any one of various available means for separating the suspended catalyst, and returning it to the system. The catalyst thus recovered may be returned directly to the reactor or optionally to the stripping zone in catalyst outlet 9. As shown, this system comprises a plurality of cyclone separators 13 and 14 arranged in series, in each of which a portion of the catalyst is separated from the vapors and withdrawn through the lower hopper, the separated vapors being withdrawn overhead and passed to the subsequent separating stage. The catalyst is withdrawn from the hoppers through tailpipes 14' and 15 which preferably extend as indicated into the reactor a short distance below the upper level of the dense catalyst phase. Tailpipes 14' and 15 are suitably provided with means 16, similar to inlet lines 12, for introducing an aerating medium thereto to maintain the catalyst passing therethrough in a flowable condition. The vaporous conversion products withdrawn from the final cyclone through line 17 are passed to a suitable products recovery system such as a fractionating tower or the like, wherein the products are separated into the desired fractions such as gasoline, fuel oil and cycle oil. The small amount of catalyst remaining in the vapors withdrawn through line 17 may be recovered by partially condensing these vapors, thereby concentrating this residual catalyst in the heavy boiling condensate which may be recycled to the reactor through feed line 4, as described in copending Belchetz application Ser. No. 386,132, filed March 31, 1941, which issued as Patent No. 2,374,073 on April 17, 1945.

In appended Table 1 there is given an illustrative example of suitable dimensions for reactor 6, and operating conditions for the conversion of a petroleum gas oil into low boiling constituents consisting of a large proportion of low boiling hydrocarbons within the gasoline boiling range and characterized by their high octane value. In this particular case the reactor was designed to process 12,040 bbls./day of a gas oil mixture comprising 63.7% of 28.1 API virgin gas oil and 36.3% of 31.5 API coke still gas oil.

*Table 1*

| | |
|---|---:|
| Gas oil feed—bbl./day | 12,040 |
| Steam feed, wt. per cent based on oil feed | 10 |
| Reactor dimensions: | |
| (a) Zone A—ht.—ft | 20 |
| Zone A—dia.—ft | 15 |
| (b) Zone B—ht.—ft | 15 |
| Zone B—dia.—ft | 19 |
| Feed wt. ratio of catalyst to oil | 5:1 |
| Oil vapor temperature (transfer line 4), °F | 895 |
| Regenerated catalyst temperature (standpipe 2), °F | 995 |
| Catalyst average concentration: | |
| (a) Zone A, lbs./cu. ft | 15 |
| (b) Zone B, lbs./cu. ft | 0.4 |
| (c) Catalyst draw-off line 9, lbs./cu. ft | 18.5 |
| (d) Vapor line 17, grains/cu. ft | 6.0 |
| Vapor velocity: | |
| (a) Zone A, ft./sec | 1.65 |
| (b) Zone B, ft./sec | 1.43 |
| Oil contact time (average), seconds | 10 |
| Catalyst contact time (average), seconds | 222 |
| Ratio of weight of oil fed/hr. to wt. of catalyst in zone A | 3.23 |
| Reactor outlet temperature (Zone A), °F | 900 |
| Reactor pressure: | |
| (a) Inlet zone A, lbs./sq. in. gauge | 10.5 |
| (b) Outlet zone B, lbs./sq. in. gauge | 8.0 |

The product distribution and yields for this operation were:

| | |
|---|---:|
| Gasoline, vol. percent | 42.5 |
| No. 3 heating oil, vol. percent | 11.7 |
| Heavy gas oil, wt. percent | 30.4 |
| No. 5 fuel oil, vol. percent | 9.6 |
| Excess butane, wt. percent | 3.0 |
| Dry gas, wt. percent | 5.0 |
| Coke, wt. percent | 4.2 |

In circulating the used or spent catalyst between the conversion zone and the regeneration zone suitable provision must be made for difference in pressure between points of withdrawal and points of introduction of the catalyst.

In the system shown, the pressure at the bottom of catalyst discharge standpipe 11 includes the head provided by the catalyst in the standpipe, the head of catalyst in zone A and the static pressure in zone B in excess of atmospheric pressure.

From the bottom of standpipe 11 spent catalyst is fed under the influence of this pressure head through a suitable feeding means such as slide valve 18 into the stream of gas flowing through the regenerator inlet line 19. Spent catalyst thus introduced is mixed with air or other suitable carrying medium such as steam introduced into pipe 19 by line 20. In case air is introduced through line 20, the quantity admitted is so controlled that any combustion of the spent catalyst occurring in line 19 is not sufficient to raise the temperature of the catalyst in excess of the maximum regeneration temperature.

The mixture of hot spent catalyst and carrying medium flows through line 19 into the bottom inlet hopper 20' of the regenerator 21 wherein it is mixed with a stream of relatively cool recycled regenerated catalyst and additional air from cooler or heat exchanger 22, and passes therewith upwardly through the regeneration chamber. Operating conditions in the regeneration chamber are preferably maintained within limits to provide a condition similar to that maintained in the reaction zone with respect to a "dense phase" or highly concentrated condition of the catalyst. This condition, similar to that maintained in the reactor, is characterized by the relatively large concentration of catalyst and low vapor velocities maintained in the lower zone A' of the regeneration chamber 21, corresponding to zone A of the reactor 6. During the course of the travel of the spent catalyst through the regeneration chamber combustion of the carbonaceous deposit thereon is effected to the required extent at an elevated temperature maintained below the safe maximum regeneration temperature by reason of the presence of the cooled recycled catalyst.

In the following Table 2 there is given an illustration of suitable dimension for regenerator 21, and operating conditions for the regeneration operation corresponding to the conversion operation given in Table 1:

*Table 2*

| | |
|---|---:|
| Regenerator dimensions: | |
|   (a) Zone A'—ht.—ft. | 40 |
|       Zone A'—dia.—ft. | 23.5 |
|   (b) Zone B'—ht.—ft. | 18 |
|       Zone B'—dia.—ft. | 27 |
| Spent catalyst—lbs./hr. | 776,490 |
| Cooled recycled catalyst—lbs./hr. | 1,259,000 |
| Ratio by weight recycled/spent catalyst | 1.6 |
| Inlet temperature, spent catalyst, °F. | 895 |
| Inlet temperature, recycled catalyst, °F. | 830 to 845 |
| Temperature, regeneration zone, °F. | 1000 |
| Catalyst average concentration: | |
|   (a) Zone A', lbs./cu. ft. | 14.8 |
|   (b) Zone B', lbs./cu. ft. | .055 |
|   (c) Catalyst draw-off passageways 23 and 24, lbs./cu. ft. | 18.0 |
|   (d) Flue gas outlet line 25, grains/cu. ft. | 400 |
| Gas velocity, ft./sec.: | |
|   (a) Zone A' | 1.8 |
|   (b) Zone B' | 1.69 |
| Catalyst contact time (average), seconds | 300 |
| Regenerator pressure, lbs./sq. in. gauge: | |
|   (a) Inlet to zone A' | 8.2 |
|   (b) Outlet from zone B' | 3.7 |

Regenerated catalyst is withdrawn directly from the dense catalyst phase zone A' and separate from the regeneration gas by a catalyst withdrawal passageway or passageways opening directly into the zone. In the embodiment shown in Fig. 1 two such passageways 23 and 24 extending a substantial distance, about midway up zone A', are provided. Outlet 23 serves for the withdrawal of regenerated catalyst which is recycled by means of catalyst standpipe 43 and line 55 through a heat exchanger or cooler 22 through which a cooling medium is circulated by lines 60 and 61, back to the regenerator 21 for temperature control therein. Outlet 24 is used for the withdrawal of regenerated catalyst which is forwarded to the conversion system through catalyst standpipe 2.

Gaseous combustion products (flue gas) mixed with a relatively small proportion of the total catalyst introduced into the regeneration zone are withdrawn by a pipe 25 opening into zone B'. This mixture may be withdrawn and the catalyst contained therein separated and returned to the system, for example to the dense catalyst zone A' by means similar to that shown at the top of reactor 6. However, a preferred system is that shown in Fig. 1. In this arrangement, the mixture of flue gas and suspended catalyst is withdrawn through an outlet pipe 25 centrally disposed in the regenerator, and exiting therefrom through the lateral extending pipe 26. From pipe 26, the mixture is preferably passed through a waste heat cooler or heat exchanger 27 through which a cooling medium is circulated by lines 28 and 29, although this cooling stage may be omitted. The cooled gaseous mixture is then passed by line 30 to a series of suitable gas-solid separators, such as cyclones 31a, 31b, and 31c and a Cottrell precipitator 32. Successive increments of the suspended catalyst are separated in each of the cyclones and withdrawn from the bottom hoppers thereof through tail pipes 33a, 33b, and 33c. These tail pipes may suitably extend beneath the level of a mass of catalyst maintained in trough 33 which extends around the periphery of the precipitator. Flue gas is separated by overhead lines 34a, 34b, and 34c, and passed to the subsequent separation zone, the make flue gas substantially free of suspended catalyst being withdrawn from the system from the top of the Cottrell precipitator through outlet pipe 35.

Catalyst separated by precipitator 32 and withdrawn from tailpipes 33a, 33b and 33c, flows by gravity to hopper 36, and is withdrawn therefrom by catalyst standpipe 37. Standpipe 37 is supplied with a suitable quantity of an aerating medium through lines 38 and operates on a principle similar to standpipe 11.

From standpipe 37, catalyst is fed by valve 39 into a stream of a suitable carrier gas such as steam introduced to return line 40 by line 41 and is carried in line 40 back to the dense phase zone A' of the regenerator. The catalyst withdrawal passageways 23 and 24 provided at the lower portion of the regenerator are associated with lines 51 and 52 for introducing steam or other stripping medium thereto similar to line 10, for the purpose of stripping entrained regeneration gas therefrom and maintaining the catalyst therein in a dense but readily flowable condition. The quantity of aerating medium introduced into the catalyst withdrawal and stripping zones 23 and 24, and likewise zone 9, is preferably such that the concentration of the catalyst is relatively great therein as compared to the reaction zone, for example about 18 lbs. per cu. ft. compared, for example, to a concentration of about 14 lbs. per cu. ft. in zones A and A'. Catalyst standpipes 2 and 43 leading from the passageways 23 and 24 are each provided with lines 44 and 45, respectively, for introducing steam or a similar inert aerating medium and maintaining a flowable dense phase of catalyst therein similarly to standpipe 11.

The height of the upper level of the dense phase in zones A and A' is dependent upon the total quantity of catalyst circulated in the system, which quantity may be varied by withdrawal of catalyst from the system through line 49 to storage when lowering of the level is desired, and addition of catalyst to the system through line 48 when raising of the level is desired. The relative height of the level in zone A to that of zone A' is controlled for a fixed quantity of circulated catalyst by suitable regulation of the catalyst discharge rates through valves 18, 46 and 47.

The modification illustrated in Fig. 4 is generally similar to that of Fig. 1, and elements thereon similar in their construction and function to those of Fig. 1 are designated with reference numerals corresponding to those employed in Fig. 1 with the subscript "a" and detailed description thereof is hence unnecessary. This modification differs from the embodiment shown in Fig. 1 in that catalyst is withdrawn from the dense phase in the reactor or regenerator at points below the inlet for the oil vapors or the inlet for the regenerating gas in place of above such inlet as in Fig. 1. In reactor 6a catalyst is withdrawn into a lower hopper 9a at the base of the reactor to which an aerating and stripping medium is supplied through line 10a. Incoming oil vapors and regenerated catalyst are supplied to reactor 6a by line 3a which enters the reactor at a point above the catalyst withdrawal zone 9a. Similarly in the regenerator, a lower catalyst withdrawal zone 24a is provided which functions similarly to withdrawal passageways 23 and 24 of Fig. 1. Means 51a are provided in zone 24a for distributing an aerating and stripping gas thereto, thereby serving the same function as lines 51 and 52 of Fig. 1.

In place of introducing the catalytic material into the lower portion of the dense phase zones B and B', it may be in some instances advantageously introduced at the upper portion thereof, as indicated by the alternative flow lines 55'a, 19'a and 3'a. The latter type of flow has the advantage of introducing the catalyst into these zones against a lower pressure head. In this modified flow regenerated catalyst may be carried through line 3'a by a current of steam or part of the oil vapors supplied through line 63, all or most of the oil vapor being supplied through line 3a, valve 46a being either closed or eliminated.

Certain variable operating conditions in the practice of the process may follow and be controlled pursuant to conventional practice in the art of vapor phase catalytic conversion of hydrocarbons, including such factors as the selection of suitable charging stock, catalytic material, conversion temperatures, and pressures.

The rate of feed of the hydrocarbon charge to a reactor of given dimensions is maintained within such limits that the upward velocity of the vapors through the zone is relatively low and sufficient to form a dense phase or mass of catalyst therein. Conversely, for the conversion of a given quantity of charging stock in a given unit of time, the cross-sectional area of the reactor must be of the dimensions required to provide the desired low vapor velocity therein. Similarly, oxygen-containing gas is introduced into the regenerator at a rate such that its upward velocity therethrough is relatively low and sufficient to form a dense phase of catalyst therein in zone A'.

The maintenance of a definite minimum upward gaseous velocity in zones A and A' is likewise regarded as highly desirable and preferable. The upward velocity of the gas in these zones should be sufficiently high to maintain the dense phase catalyst in a highly turbulent condition whereby individual catalyst particles circulate throughout the dense phase zone. Although the composition of any individual particle with respect to its carbonaceous content is constantly changing in these zones (such content being progressively increased in zone A and progressively decreased in zone A'), the mass of catalyst particles as a whole tends to reach an average composition throughout the dense phase zone due to the highly turbulent condition maintained. This turbulent and circulatory motion of the catalyst also exhibits itself by the substantially uniform temperature maintained throughout the dense phase in both the conversion zone A and regeneration zone A' and the lack of a decided temperature gradient therein, despite the fact that in the former case heat is absorbed by the endothermic cracking reaction and in the latter case heat is evolved by the exothermic combustion reaction. The optimum velocity both with respect to its minimum and maximum value will be dependent upon the density, size, and shape of the catalyst particles employed and for any particular size or sizes of particles this velocity is adjusted so as to maintain the described highly turbulent and dense phase condition. For a finely divided powdered catalyst consisting of a range of mixed size particles, all or most of which are smaller than 100 microns, a gas velocity within the range of about 1.5 to 2 ft. per second is regarded as preferable. In general the maximum gas velocity contemplated for zones A and A' is of the order of 6 ft. or less per second and usually less than 4 ft. per second. The minimum velocity for a finely divided powdered catalyst consisting predominantly of particles smaller than 100 microns normally will exceed about 0.5 ft. per second in order to maintain the desired degree of turbulence.

Although the entire mass of catalyst in the dense phase zone tends to reach a substantial uniform composition, there will be a localized tendency for that portion of the dense phase immediately adjacent the incoming stream of catalyst particles to approach such incoming particles in composition. Accordingly, we prefer an arrangement such as shown in Fig. 1 whereby the catalyst is withdrawn from the dense phase by catalyst withdrawal passageways 9, 24 and 23 which open into the dense phase at points spaced a substantial distance from the incoming stream of particles.

The rate of fresh catalyst feed is dependent upon the desired average catalytic activity of the dense phase of catalyst in the conversion zone, and fresh catalyst is continually added at a rate adapted to maintain such activity at the desired value as the conversion proceeds. Used catalyst is withdrawn at the same average rate as fresh catalyst is added, therefore, the average time a catalyst particle remains in the reactor (catalyst resident time) is determined by the catalyst feed rate and may be calculated by dividing the weight of catalyst in the reactor by the catalyst feed rate per minute. The concentration (density) of catalyst in the dense phase is dependent primarily upon the particular low vapor velocity maintained. Within limits, an increase or decrease of the rate of catalyst feed apparently has no substantial or significant effect on the concentration of the dense phase at the relatively low vapor velocity maintained.

The weight of catalyst in the reactor and regenerator is dependent primarily upon the concentration of the dense phase (in turn dependent primarily upon the particular low velocity maintained) and the maintained height of the dense phase zone.

It is contemplated that the practice of the process in catalytic cracking, under most conditions, may be satisfactorily effected, utilizing a catalyst to oil feed weight ratio within the range of about 0.5 to 1.0 to 20 to 1.0 and preferably within the more restricted range of about 2:1 to 8:1, and with a value of the ratio of weight of oil feed per hour to weight of catalyst in the reactor (w./hr./w.) within the range of about 1.0 to 25.0 and preferably within the more restricted range of about 2.5 to 10.0.

Any of the various known types of cracking catalysts may be utilized in the application of the process to the catalytic cracking of high boiling hydrocarbons. The preferred catalysts are those of the silica-alumina, or silica-magnesia type adapted to produce a satisfactory yield of high octane gasoline. Either silica-alumina catalyst consisting of activated clay prepared by the acid treatment of natural clays, for example the commercial product "Super Filtrol" or a synthetically prepared silica-alumina catalyst such as those disclosed in copending applications of Robert Ruthruff, Serial Nos. 305,472 and 305,473, both filed November 21, 1939, now Patent Nos. 2,391,-481 and 2,391,482, respectively, may be employed. The catalyst is preferably employed in finely divided or powdered condition, for example with particles of mixed sizes ranging from about 1 to 100 microns. However, relatively coarse or granular particles may be employed. In general, a catalyst consisting of a range of, rather than uniformly sized, particles is preferred. Other variable operating conditions such as temperature, pressures, feed stocks, and the like, may be selected and controlled pursuant to conventional practice in the art of vapor phase catalytic cracking of high boiling hydrocarbons.

Prior to our invention, it has been proposed to effect the catalytic conversion of hydrocarbons by a system and method generally similar to that described in the foregoing, except that in the former case both the suspended solids and gases are withdrawn together overhead from the regeneration and/or conversion zone, and the mixture of solids and gases thereafter passes through suitable separating means such as a set of cyclone separators to separate the suspended solids which are then returned to an appropriate point in the system.

It will be apparent that the present method has a number of outstanding advantages compared with this previously proposed method. One of the advantages resulting from the direct withdrawal of the suspended solids from the dense phase zone separately from the gases consists in the substantial elimination of the tendency for heavier particles to accumulate and remain in the dense phase zone for an unduly long period of time or indefinitely. A further advantage of the present method resides in the utilization of the fluid pressure head of the mass of catalyst in the conversion and regeneration zone to facilitate the circulation of catalyst between these zones. A further advantage resides in the general facilitation of control of operating conditions, and particularly the comparatively simple method of control which it provides with respect to the quantity of catalyst maintained in the conversion and regeneration zone. A further advantage resides in the elimination of collecting hoppers necessary in the previously proposed systems and the reduction in the total quantity of catalyst in circulation by reason of the catalyst "hold-up" in such hoppers.

Various modifications of the described method of practicing the invention will be apparent to those skilled in the art. For example, the catalyst may be withdrawn directly from either zone A or zone A' alone and not from both as illustrated. For example, the vaporous reaction products and all the catalyst may be withdrawn together overhead from the conversion zone, and the catalyst separated in a separating zone extraneous of the reaction zone, stripped of entrained vapors and then passed to the regeneration zone. In this same system, the catalyst would be withdrawn directly from the dense phase zone A' of the regeneration zone as illustrated in Fig. 1. Likewise, the reverse of this modification might be employed. The reverse modification would involve withdrawal of the catalyst directly from zone A only, and the withdrawal of all the catalyst and regeneration gas together overhead from the regeneration zone.

In the preferred mode of practicing our invention, the level of each of the dense phase zones A and A' is preferably maintained a sufficient distance below the upper outlet, by suitable regulation as previously described of the valves controlling the quantity of catalyst flowing through the catalyst withdrawal passageways 9, 24 and 23 and the total quantity of catalyst circulated through the system, that a relatively small quantity of catalyst is carried out overhead with the effluent gas, for example a concentration in such gas of solids of the order of about 500 grains/cu. ft., or less. However, if desired, a substantially large proportion of the catalyst may be withdrawn overhead with the effluent gas simultaneously with the withdrawal of a substantial proportion directly from the dense phase zone or zones. This effect may be produced by control of the distance of the level of the dense phase from the overhead outlet and permitting the level to rise a suitable distance when it is desired to withdraw a larger quantity of catalyst overhead. For example, in the regeneration stage, the recycled catalyst normally withdrawn from the bottom of zone A' through passageway 23 may be withdrawn overhead, and catalyst be withdrawn directly from the dense phase zone A' only through passageway 24. It is contemplated that this particular modification would have certain advantages since that portion of the catalyst recycled and the flue gases could be passed together through an exchanger, thereby simultaneously effecting cooling of both components in a single exchanger.

In place of utilizing catalyst standpipes 11, 2 and 43 as shown for providing the required pressure head for circulating the catalyst between points of different pressures, so called "solids pump" may be substituted such as described in Kinyon Patent 1,533,539.

While the method has been described particularly in connection with the catalytic conversion of high boiling hydrocarbons to low boiling hydrocarbons within the gasoline boiling range, for which purpose the method is especially advantageous, it will be apparent to those skilled in the art that the method may be applied to other types of catalystic hydrocarbon conversion reactions, such as the catalytic reforming of naphtha fractions under conditions such as described in Belchetz application Serial No. 348,605 and to chemical reactions and treating operations generally involving the step of contacting vapors with finely divided solids. These and various other modifications in the illustrative embodiments of the invention described in the foregoing will be apparent to those skilled in the art and the scope of the invention is accordingly not to be restricted except as required by the claims appended hereto.

We claim:

1. In a contacting system for handling powdered solids, a first contacting chamber, means for passing gases or vapors upwardly in said chamber at such a rate as to maintain a dense turbulent suspended solids phase therein which is superimposed by a light dispersed solids phase, means for withdrawing dense phase solids directly from the dense turbulent suspended solids phase, means for maintaining the withdrawn solids in aerated condition, a second contacting chamber, means for passing gases or vapors upwardly therein at such a rate as to maintain a second dense turbulent suspended solids phase superimposed by a light dispersed solids phase, means for introducing into this second dense turbulent solids phase the aerated solids from the first dense turbulent suspended solids phase, means for withdrawing dense phase solids directly from the second dense turbulent suspended solids phase, means for maintaining the withdrawn solids in aerated condition, means for returning the last-named aerated solids to said first-named dense turbulent suspended solids phase, means at the top of each chamber for separating solids from removed gases or vapors and for returning said separated solids to the dense turbulent suspended solids phase therein and means including an internal standpipe extending upwardly into at least one of said dense turbulent suspended solids phases and terminating below the upper level of said phase for removing dense phase solids therefrom.

2. In apparatus for catalytic conversion, a vertical contacting chamber, means for introducing gas or vapor at a low point in said chamber at such a rate as to maintain a dense turbulent suspended catalyst phase therein, means for removing gases and vapors from the upper part of said chamber, separate means including a standpipe extending upwardly in said chamber to a point below the level of the dense turbulent suspended catalyst phase therein for removing catalyst directly from said dense turbulent suspended catalyst phase, means for separating catalyst from gases and vapors removed from the top of said chamber and means for returning the separated catalyst directly to the dense turbulent suspended catalyst phase.

3. In a fluid catalyst system a cylindrical reactor, an internal standpipe extending upwardly in said reactor and downwardly through the base thereof, means for introducing powdered catalyst into said reactor, means for introducing a suspending gas or vapor at the base of said reactor at such a rate as to maintain a dense turbulent suspended catalyst phase in said reactor and adjacent said standpipe, a catalyst settling section at the upper part of said reactor and above the top of said standpipe, means for centrifugally removing catalyst particles from the gases or vapors leaving the upper settling section and for returning the separated catalyst to said dense turbulent suspended catalyst phase, means for aerating and stripping catalyst in said standpipe and means for withdrawing catalyst from the base of said standpipe.

4. The method of effecting the catalytic cracking of gas oil and heavier hydrocarbons which method comprises vaporizing a hydrocarbon charging stock and heating said vapors to a cracking temperature, suspending hot powdered catalyst in said vapors and introducing said vapors together with suspended catalyst into an up-flow reaction zone at a point spaced from the bottom of said zone, maintaining a turbulent dense phase of suspended catalyst in the intermediate part of said reaction zone, separating catalyst from vapors leaving the upper part of said reaction zone and returning said separated catalyst to the intermediate part of said reaction zone, withdrawing catalyst from the lower part of said dense phase reaction zone to a zone below the vapor inlet thereto, aerating the catalyst in said zone below the point of charging stock vapor inlet and withdrawing catalyst from the bottom of said last-named zone.

5. The method of effecting catalytic conversion of hydrocarbons by means of powdered catalyst which method comprises continuously introducing a stream of hydrocarbons at the base of a first contacting zone, continuously introducing catalyst into said zone, maintaining a dense phase of suspended catalyst in said zone, continuously removing conversion products from said zone at a point above the level of said dense suspended catalyst phase, continuously transferring catalyst from the dense catalyst phase in the first contacting zone to an adjacent stripping zone, passing the stripping gas through said stripping zone and into said first contacting zone, withdrawing catalyst from said stripping zone as a downwardly moving aerated catalyst column, transferring catalyst from the base of said column to a second contacting zone, introducing air at the base of the second contacting zone, maintaining a dense suspended catalyst phase in said second contacting zone, withdrawing gas from said second contacting zone at a point above the level of the dense catalyst phase therein, continuously withdrawing catalyst from the dense phase in said second contacting zone as a downwardly moving aerated column, transferring catalyst from the base of said column back to the first contacting zone, and effecting catalyst circulation throughout the system by gas lift and gravity whereby abrasion of catalyst by mechanical impellers is entirely avoided.

6. The method of operating a catalytic conversion system which comprises introducing hydrocarbon vapors at a low point in a first contacting zone containing powdered catalyst, passing hydrocarbon vapors upwardly through the first zone at such a rate as to produce a dense turbulent suspended catalyst phase and a light upper dispersed catalyst phase at the top of said zone, passing regeneration gases upwardly through a second zone containing powdered catalyst at such a rate as to produce a dense turbulent suspended catalyst phase and a light upper dispersed catalyst phase at the top of said zone, withdrawing catalyst from the first dense phase, stripping the withdrawn catalyst in a zone which is out of contact with introduced hydrocarbon vapors, withdrawing the stripped catalyst as a downwardly moving aerated column from the stripping zone, suspending catalyst from the base of said column in an oxygen-containing regeneration gas, introducing said suspension at a low point in the second zone whereby the stripped catalyst is introduced into the second dense phase, withdrawing catalyst from the second dense phase, and introducing it back to the first dense phase, separating catalyst from the light upper dispersed catalyst phase at the top of at least one of said zones and returning the separated catalyst directly to the dense turbulent suspended catalyst phase in said zone.

7. The method of effecting the catalytic cracking of gas oil and heavier hydrocarbons, which method comprises introducing a stream of hydrocarbon vapors into an intermediate point of a reaction chamber containing a body of finely divided cracking catalyst maintained at cracking temperature, continuously introducing a stream of said finely divided cracking catalyst into said cracking chamber, maintaining a turbulent dense phase of suspended catalyst in an intermediate part of said reaction chamber above the point of introduction of said vapors, separating catalyst from vapors leaving the upper part of said reaction chamber and returning the separated catalyst to said chamber, withdrawing catalyst from said reaction chamber above the point of introduction of said vapors into a zone below the point of vapor introduction, aerating the catalyst in a zone below the point of introduction of the vapors and withdrawing catalyst from the bottom of said cracking chamber.

8. The method of operating a catalytic conversion system employing solid catalyst particles in two contacting zones which method comprises transferring hot powdered catalyst from a first contacting zone to a second contacting zone, maintaining a dense, turbulent, suspended catalyst phase superimposed by a dilute catalyst phase in the second contacting zone by passing gases upwardly in said zone at low velocity, recovering catalyst from the dilute phase and returning it to the system, withdrawing gases from which dilute phase catalyst has been separated, separately withdrawing catalyst directly from said dense turbulent suspended catalyst phase to a stripping zone, stripping catalyst in said stripping zone, withdrawing catalyst from the stripping zone as a downwardly moving column, aerating the catalyst in said column while maintaining it in dense phase condition, and transferring catalyst from the base of said column to said first contacting zone.

9. A method for catalytic cracking of hydrocarbons to produce motor fuel which comprises introducing finely divided catalyst and heated vaporous hydrocarbons into the lower portion of a reaction zone exterior to a reservoir arranged to extend into the bottom portion of said reaction zone, passing the vapors through said reaction zone at such a velocity to form a fluidized mass in said reaction zone having a level above said reservoir and to effect the desired extent of conversion during which contamination of the catalyst particles occurs, collecting most of the contaminated catalyst particles in said reservoir, removing contaminated catalyst particles as a fluidized mass from said reaction chamber through the bottom of said reservoir, and maintaining the level of the fluidized mass at a desired height by controlling the amount of fluidized mass withdrawn from said reservoir.

10. The method of operating a catalytic conversion system which comprises introducing hydrocarbon vapors at a low point in a first contacting zone containing powdered catalyst, passing hydrocarbon vapors upwardly through the first zone at such a rate as to produce a dense turbulent suspended catalyst phase and a light upper dispersed catalyst phase at the top of said zone, passing regeneration gases upwardly through a second zone containing powdered catalyst at such a rate as to produce a dense turbulent suspended catalyst phase and a light upper dispersed catalyst phase at the top of said zone, withdrawing catalyst from the first dense phase, stripping the withdrawn catalyst in a zone which is out of contact with introduced hydrocarbon vapors, withdrawing the stripped catalyst as a downwardly moving aerated column from the stripping zone, suspending catalyst from the base of said column in an oxygen-containing regeneration gas, introducing said suspension at a low point in the second zone whereby the stripped catalyst is introduced into the second dense phase, withdrawing catalyst from the second dense phase, and introducing it back to the first dense phase, withdrawing gases or vapors from the light upper dispersed catalyst phase at the top of at least one of said zones, separating catalyst from said gases or vapors being withdrawn, and returning the separated catalyst directly to the dense turbulent suspended catalyst phase in said zone.

11. In a contacting system for handling powdered solids, a first contacting chamber, means for passing gases or vapors upwardly in said chamber at such a rate as to maintain a dense turbulent suspended solids phase therein which is superimposed by a light dispersed solids phase, means for withdrawing dense phase solids directly from the dense turbulent suspended solids phase, means for maintaining the withdrawn solids in aerated condition, a second contacting chamber, means for passing gases or vapors upwardly therein at such a rate as to maintain a second dense turbulent suspended solids phase superimposed by a light dispersed solids phase, means for introducing into this second dense turbulent solids phase the aerated solids from the first dense turbulent suspended solids phase, means for withdrawing dense phase solids directly from the second dense turbulent suspended solids phase, means for maintaining the withdrawn solids in aerated condition, means for returning the last-named aerated solids to said first-named dense turbulent suspended solids phase, means at the top of at least one of said chambers for separating solids from removed gases or vapors and returning said separated solids to the dense turbulent suspended solids phase therein and means including an internal standpipe extending upwardly into at least one of said dense turbulent suspended solids phases and terminating below the upper level of said phase for removing dense phase solids therefrom.

12. In apparatus for catalytic conversion, a contacting chamber, means for introducing gas or vapor at a low point in said chamber at such a rate as to maintain a dense turbulent suspended catalyst phase therein, means for removing gases and vapors from the upper part of said chamber, separate means including a standpipe extending upwardly in said chamber to a point below the level of the dense turbulent suspended catalyst phase therein for removing catalyst directly from said dense turbulent suspended catalyst phase, and means for separating catalyst from gases and vapors removed from the top of said chamber and returning the separated catalyst to the dense turbulent suspended catalyst therein.

13. The method of effecting the catalytic conversion treatment of a gas or vapor which method comprises suspending hot powdered catalyst in said gas or vapor and introducing said gas or vapor together with suspended catalyst into an upflow reaction zone at a point spaced from the bottom of said zone, maintaining a turbulent dense phase of suspended catalyst in the intermediate part of said reaction zone, separating catalyst from gas or vapor leaving the upper part of said reaction zone and returning said separated catalyst to the intermediate part of said reaction zone, withdrawing catalyst from the lower part of said dense phase reaction zone to a point below the gas or vapor inlet thereto, aerating the catalyst in said zone below the point of charging stock inlet and withdrawing catalyst from the bottom of said last named zone.

14. The method of effecting the catalytic conversion treatment of a gas or vapor which method comprises introducing said gas or vapor and hot powdered catalyst into an upflow reaction zone at a point spaced from the bottom of said zone, maintaining a turbulent dense phase of suspended catalyst in the intermediate part of said reaction zone, separating catalyst from gas or vapor leaving the upper part of said reaction zone, withdrawing catalyst from the lower part of said dense phase reaction zone to a zone below the gas or vapor inlet thereto, aerating the catalyst in said zone below the point of charging stock inlet and withdrawing catalyst from the bottom of said last named zone.

15. The method of effecting the catalytic conversion of a gas or vapor by means of powdered catalyst which method comprises continuously introducing a stream of said gas or vapor at the base of a contacting zone, continuously introducing catalyst into said zone, maintaining a dense phase of suspended catalyst in said zone, continuously removing conversion products from said zone at a point above the level of said dense suspended catalyst phase, continuously transferring catalyst from the dense catalyst phase in said contacting zone to an adjacent stripping zone, passing the stripping gas through said stripping zone and into said contacting zone, withdrawing catalyst from said stripping zone as a downwardly moving aerated catalyst column and transferring catalyst from the base of said column to a catalyst regeneration zone.

16. In a fluid catalyst system a reaction chamber, means for introducing powdered catalyst into said reaction chamber, means for introducing a gas or vapor into said reaction chamber at a low point therein at such a rate as to maintain a dense turbulent suspended catalyst phase in said reaction chamber above the point of introduction of said gas or vapor, means for removing gaseous or vaporous reaction products from said reaction chamber at a point substantially above said dense turbulent suspended catalyst phase, means associated with said reaction chamber for removing catalyst directly from said dense catalyst phase and from the path of said suspending gases or vapors, a hopper for receiving catalyst thus withdrawn from the dense catalyst phase, means for introducing stripping gas into said hopper, a standpipe located below said hopper and adapted to receive stripped catalyst therefrom, means for transferring stripped catalyst from a low point in said hopper to the top of said standpipe, means for aerating catalyst passing downwardly through said standpipe to maintain said catalyst in a dense fluidized condition, and means for discharging catalyst from the base of said standpipe.

17. A method for contacting a gas or vapor with finely-divided solid contact material which comprises introducing said finely-divided contact material and said gas or vapor into the lower portion of a contact zone exterior to a reservoir arranged to extend into the bottom portion of said contact zone, passing the gas or vapor through said contact zone at such a velocity to form a fluidized mass in said contact zone having a level above said reservoir and to effect the desired extent of contact treatment during which the contact particles become spent, collecting spent contact particles in said reservoir, removing said spent contact particles as a fluidized mass from said contact chamber through the bottom of said reservoir, and maintaining the level of the fluidized mass at the desired height by controlling the amount of fluidized mass withdrawn from said reservoir.

18. A method for catalytic conversion of hydrocarbons to produce motor fuel which comprises introducing finely-divided catalyst and heated vaporous hydrocarbons into the lower portion of a reaction zone exterior to a reservoir arranged to extend into the bottom portion of said reaction zone, passing the vapors through said reaction zone at such a velocity to form a fluidized mass in said reaction zone having a level above said reservoir and to effect the desired extent of conversion during which contamination of the catalyst particles occurs, collecting most of the contaminated catalyst particles in said reservoir, removing contaminated catalyst particles as a fluidized mass from said reaction chamber through the bottom of said reservoir, and maintaining the level of the fluidized mass at a desired height by controlling the amount of fluidized mass withdrawn from said reservoir.

19. The method of operating a catalytic conversion system which comprises introducing a gas or vapor to be converted at a low point in a contacting zone containing powdered catalyst, passing said gas or vapor upwardly through said zone at such a rate as to produce a dense turbulent suspended catalyst phase and a light upper dispersed catalyst phase at the top of said zone, withdrawing catalyst from said dense phase, stripping the withdrawn catalyst in a stripping zone which is out of contact with gas or vapor introduced into said contact zone, withdrawing the stripped catalyst as a downwardly moving aerated column from the stripping zone, transferring catalyst from the base of said column to a regeneration zone, transferring regenerated catalyst from the regeneration zone to the dense phase of catalyst in said contacting zone, withdrawing gases or vapors from the light upper dispersed catalyst phase at the top of said contacting zone, separating catalyst from said gases or vapors being withdrawn and returning the separated catalyst to the dense turbulent suspended catalyst phase in said contacting zone.

HENRY P. WICKHAM.
JOSEPH W. MOORMAN.

REFERENCES CITED

The following references are of record in the file of this patent:

UNITED STATES PATENTS

| Number | Name | Date |
|---|---|---|
| Re. 21,526 | Odell | Aug. 6, 1940 |
| 2,253,486 | Belchetz | Aug. 19, 1941 |
| 2,264,438 | Gaylor | Dec. 2, 1941 |
| 2,273,075 | Weems, 3rd | Feb. 17, 1942 |
| 2,303,047 | Hemminger | Nov. 24, 1942 |
| 2,326,705 | Thiele et al. | Aug. 10, 1943 |
| 2,341,193 | Scheineman | Feb. 4, 1944 |
| 2,488,027 | Page | Nov. 15, 1949 |
| 2,488,028 | Scheineman | Nov. 15, 1949 |
| 2,488,029 | Scheineman | Nov. 15, 1949 |
| 2,488,031 | Gunness | Nov. 15, 1949 |

FOREIGN PATENTS

| Number | Country | Date |
|---|---|---|
| 533,037 | Germany | Sept. 8, 1931 |
| 829,582 | France | Apr. 5, 1938 |